Oct. 28, 1969     R. L. HUMMEL     3,475,119

PRODUCTION OF SULPHURIC ACID

Filed Dec. 23, 1966     2 Sheets-Sheet 1

INVENTOR
RICHARD L. HUMMEL

BY: Smart & Biggar
ATTORNEYS

3,475,119
PRODUCTION OF SULPHURIC ACID
Richard L. Hummel, 87 Boulton Drive,
Toronto, Ontario, Canada
Filed Dec. 23, 1966, Ser. No. 604,491
Int. Cl. C01b 17/76, 17/74
U.S. Cl. 23—168                    10 Claims

ABSTRACT OF THE DISCLOSURE

There is described a process for the production of sulfuric acid in which sulfur dioxide is catalytically oxidized at elevated temperature in a plurality of zones. After at least the first or one of the intermediate zones at least a portion of the gaseous reaction mixture is withdrawn and cooled in the presence of steam in a heat exchange to condense sulfuric acid. The sulfur trioxide in the gases exiting from the final zone is recovered as sulfuric acid, preferably by passage through a plurality of heat exchangers.

---

Figure 1B:
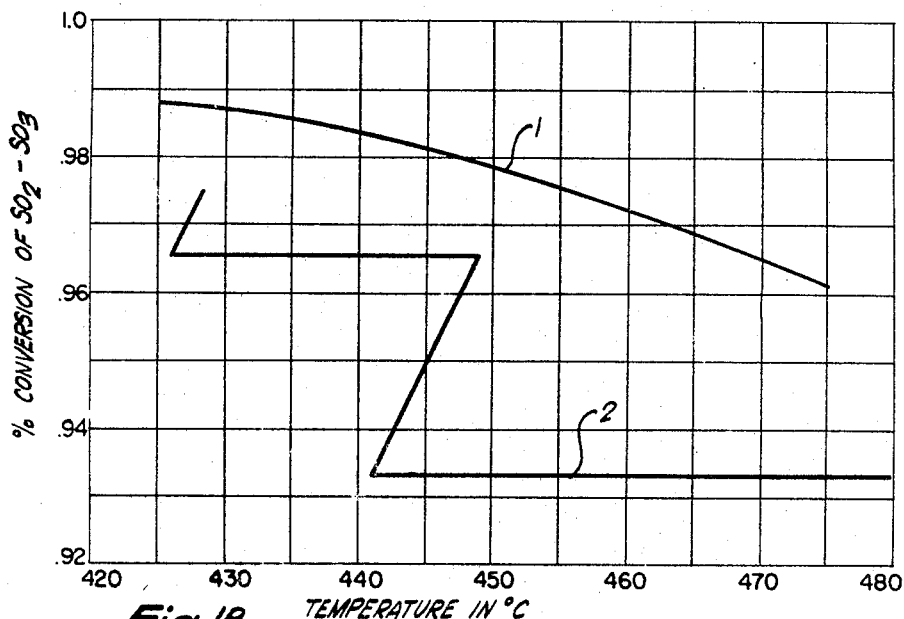

The present invention relates to the production of sulphuric acid. In particular the present invention provides a process for the production of sulphuric acid in improved yields and at a lower cost per ton than the conventional so-called "contact process."

Sulphuric acid is presently produced on a commercial scale by the so-called "contact process" in which a dry gaseous mixture of sulphur dioxide and an oxygen containing gas such as air is passed in contact with a catalyst at an elevated temperature usually in the range 380 to 550° C. and preferably 400 to 500° C. so as to oxidize the sulphur dioxide to sulphur trioxide and the gases exiting from the catalyst zone are absorbed in an absorption tower in a recirculating mass of concentrated sulphuric acid the more concentrated sulphuric acid so formed being subsequently diluted with water added to the recirculating body of concentrated sulphuric acid to reform the concentrated sulphuric acid and the excess sulphuric acid is drawn off as the product.

A major problem in the production of sulphuric acid is the avoidance of the stable fine sulphuric acid mist which may be formed during the process particularly when the sulphur trioxide containing gas exiting from the catalyst zone is absorbed in the recirculating body of concentrated sulphuric acid. In order to avoid the formation of this mist which is in practice unrecoverable in the process and which causes pollution problems in the atmosphere, it has been considered essential to use as the absorption liquid concentrated sulphuric acid as opposed to water in view of its lower water vapour pressure and to maintain the gaseous reaction mixture of sulphur dioxide and the oxygen containing gas dry. Further it has also been found necessary to cool the sulphur trioxide containing gas exiting from the catalyst zone before absorption in the recirculating body of concentrated sulphuric acid. The maintenance of dry gases in the catalyst zone was also considered to have the advantage of avoiding attack of the catalyst by sulphuric acid which could form in the catalyst zone on the conversion of sulphur dioxide to sulphur trioxide with water vapour present.

It has been proposed in U.S. Patent No. 2,172,617 that sulphuric acid may be advantageously produced by the oxidation of sulphur dioxide with an oxygen containing gas in the presence of at least sufficient water vapour to form concentrated sulphuric acid using a catalyst which is resistant to attack by water vapour, usually comprising vanadium pentoxide, the formation of the stable sulphuric acid mist being avoided by condensation of the sulphur trioxide containing gases and the water vapour exiting from the catalyst zone in a heat exchanger under certain specific condensing conditions.

The process proposed in the United States patent has the advantage of eliminating the necessity for the maintenance of dry gases entering the catalyst zone and thus eliminates the drying towers which are required for this purpose in the plant and further eliminates the costly plant including pumps and storage tanks necessary for the continual recirculation of the concentrated sulphuric acid to absorb the sulphur trioxide exiting from the catalyst zone. In addition the power necessary to operate the drying tower and to recirculate the concentrated sulphuric acid in the absorption tower is saved. Again the process of the United States patent has the advantage of allowing for recovery from the process in addition to the heat of oxidation of sulphur dioxide to sulphur trioxide according to the reaction scheme:

the heat of formation of sulphuric acid vapour according to the reaction scheme:

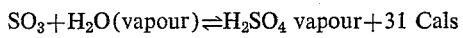

and the heat of condensation of sulphuric acid vapour to liquid sulphuric acid according to the following reaction scheme:

It will be seen from the above that with the conventional contact process using recirculating concentrated sulphuric acid for the absorption of the sulphur trioxide the only recoverable heat is the heat of oxidation of sulphur dioxide to sulphur trioxide and that the heat of formation of sulphuric acid vapour and the heat of condensation of this vapour is taken up in a large volume of recirculating concentrated sulphuric acid and therefore substantially lost to the process. The replacement of the recirculating body of sulphuric acid by a heat exchanger and the presence of water vapour in the gases exiting from the catalyst zone allows for the recovery of substantially more heat from the process than has been possible. However, as it is pointed out in the patent, it is necessary in the condensation in order to avoid formation of sulphuric acid mist that the condensation should be effected slowly at a temperature between the dew point of sulphuric acid in the exchanger and 140° C. and to this end in order to obtain a maximum residence time in this temperature range, it is required in the process to have excess steam present over that necessary to form concentrated sulphuric acid so as to maintain the dew point as high as possible. This process, therefore, produces sulphuric acid up to a concentration of about 98.6% and is incapable of producing a more highly concentrated sulphuric acid in view of the requirement of an excess of water vapour.

Further in the conventional contact process, during the oxidation of sulphur dioxide to sulphur trioxide, usually at a temperature from 400 to 500° C. to obtain a reasonable reaction rate it has been found that the percentage conversion of the sulphur dioxide to sulphur trioxide decreases with increasing temperatures in the catalyst zone and due to the exothermic nature of the oxidation reaction it will be readily seen that the temperature in the catalyst zone increases as the oxidation proceeds. It has therefore been found necessary in the conventional contact process to pass the gaseous reaction mixture of sulphur dioxide and the oxygen containing gas sequentially through a plurality of catalyst zones the gases being cooled outside the catalyst zone after passage through each catalyst zone. Reference is made in this respect to the accompanying drawings in which FIGURES 1A and 1B are graphs showing plots of percentage conversion of sulphur dioxide to sulphur trioxide in a typical conventional contact catalyst system under particular reaction conditions with respect to the temperature of the catalyst zone and FIGURE 2 is a diagrammatic view of an apparatus for use in the process of the present invention.

Figure 1A:
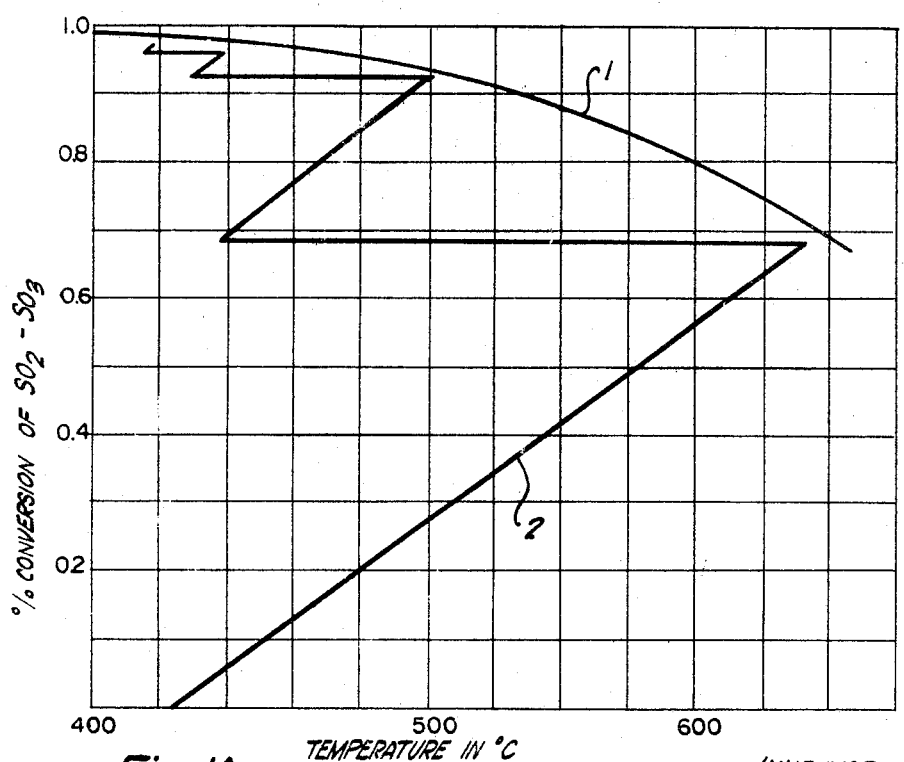
Figure 2:
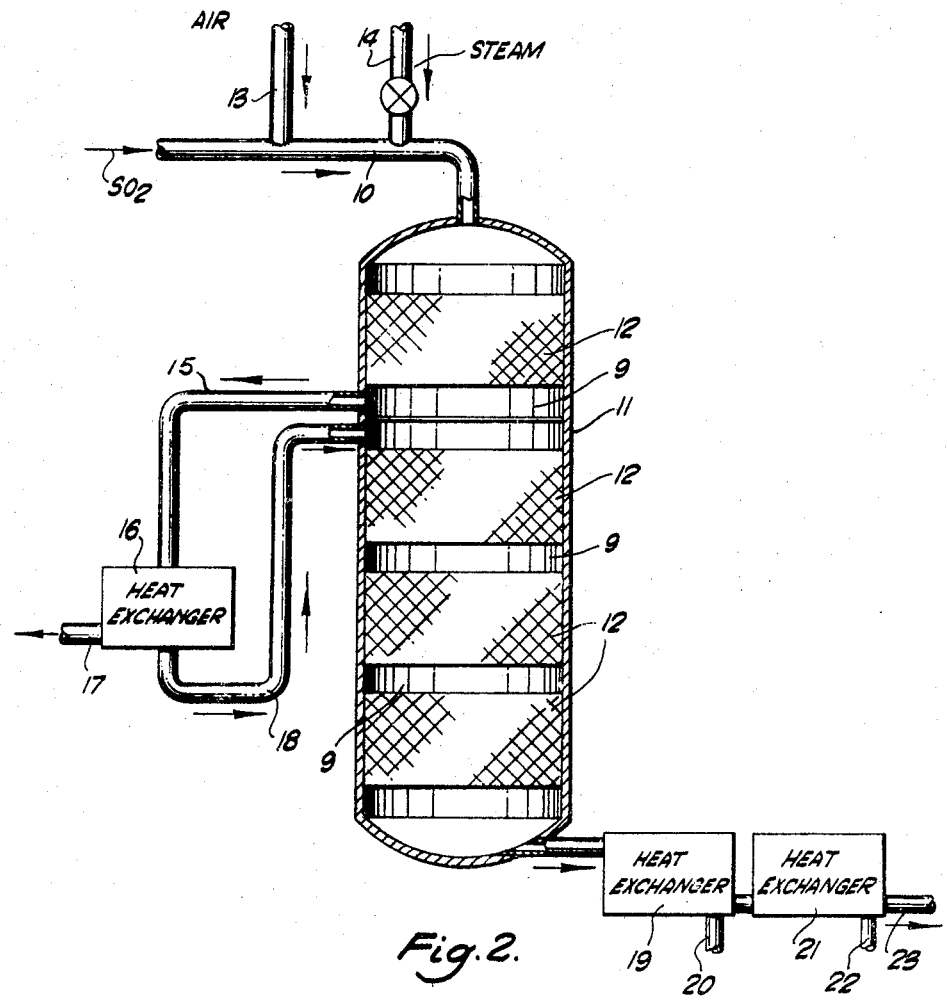

It will be seen that FIGURE 1B is an enlarged representation of the upper part of the graph of FIGURE 1A. Referring to these two figures the line 1 represents a plot of the variation of maximum percentage conversion of sulphur dioxide to sulphur trioxide in the catalyst zone with temperature and it will be noted that the maximum percentage conversion decreases substantially between 400 and 600° C. and the line 2 is a plot of the temperature and percentage conversion for the catalyst zone of a typical contact process under particular reaction conditions in which the gaseous reaction mixture of sulphur dioxide and the oxygen containing gas is periodically withdrawn from the catalyst zone cooled and returned thereto for further conversion.

As is shown in FIGURES 1A and 1B the optimum temperature with the particular contact catalyst system and under the particular reaction conditions in the catalyst zone with respect to the rate of reaction and the percentage conversion of sulphur dioxide to sulphur trioxide is approximately in the range 400 to 420° C. in the final stage whence the maximum percentage conversion is about 97.5%.

The present invention provides an improvement in the conventional contact process for the production of sulphuric acid in which the maximum overall percentage conversion of sulphur dioxide to sulphur trioxide using a particular catalyst system and under particular reaction conditions in the catalyst zone is substantially increased over the maximum percentage conversion of sulphur dioxide to sulphur trioxide attainable with the same catalyst system and under substantially the same reaction conditions in the conventional process thus increasing the yield of sulphuric acid from the plant. The present invention also provides, in the aforesaid process, for the utilisation of the heat of oxidation of sulphur dioxide to sulphur trioxide, the heat of formation of sulphuric acid and the heat of condensation of sulphuric acid vapour to generate high temperature-high pressure steam which may be used to operate the process, i.e., the overall plant and as such substantially reduce the operating costs of the plant.

It has now been found that, in the aforesaid process, when, on passage of the gaseous reaction mixture containing sulphur dioxide and the oxygen containing gas sequentially through a plurality of catalyst zones for contact with the catalyst to form sulphur trioxide, at least a portion of the gaseous reaction mixture is withdrawn from the catalyst zone and subjected to cooling in the presence of steam in a heat exchanger such that sulphuric acid is condensed therefrom and removed from the process as the product, then the total percentage conversion of sulphur dioxide to sulphur trioxide in the catalyst zone is increased above that obtainable with the same catalyst and under substantially the same reaction conditions in the catalyst zone without the removal of sulphur trioxide therefrom as condensed sulphuric acid. The sulphur trioxide containing gas and steam exiting from the final catalyst zone will desirably be condensed in a plurality of heat exchangers having good heat exchange surfaces for the recovery of heat therefrom at high temperature to form sulphuric acid and at the same time avoid the formation of sulphuric acid mist.

Thus with the typical catalyst system and reaction conditions illustrated by the graphs of FIGURES 1A and 1B of the accompanying drawings it is possible by the present invention to increase the overall percentage conversion of sulphur dioxide to sulphur trioxide under the same reaction conditions and temperatures over and above that obtainable heretofore with the conventional contact process and in particular at a temperature in the range 400 to 420° C. to increase the overall percentage conversion of sulphur dioxide to sulphur trioxide substantially above 97.5%.

According to the present invention therefore there is provided a process in the production of sulphuric acid comprising oxidizing sulphur dioxide with an oxygen containing gas at elevated temperature in the presence of a contact catalyst in a plurality of catalyst zones, withdrawn and cooling at least a portion of the gaseous reaction mixture in the presence of steam to condense sulphuric acid from said gaseous mixture in a heat exchanger after contact with the catalyst in at least the first or one of the intermediate catalyst zones and recovering the residual sulphur trioxide as sulphuric acid from the gases exiting from the final catalyst zone desirably by passage thereof through a plurality of heat exchangers. By the formation of sulphuric acid during the oxidation of sulphur dioxide to sulphur trioxide in the catalyst zone with the removal of sulphuric acid from the process, sulphur trioxide is removed from the gaseous reaction mixture and it will be readily seen that at any particular temperature of the catalyst zone with any particular catalyst system under any particular reaction conditions in the zone the maximum overall percentage conversion of sulphur dioxide to sulphur trioxide is substantially increased over that obtainable at the same temperature and under the same reaction conditions with the conventional contact process.

Thus referring once more to FIGURES 1A and 1B although the catalytic conversion process of sulphur dioxide to sulphur trioxide is effected under precisely the same reaction conditions and at precisely the same temperatures such that substantially the same plot is attained as is shown in FIGURES 1A and 1B, by effecting at least one, preferably the first, cooling stage under conditions such that condensation of sulphuric acid occurs in the heat exchanger, sulphur trioxide is removed from the system and thus conversion will continue until 97.5% of the gaseous mixture of sulphur dioxide and oxygen containing gas remaining after the condensation, has been converted to sulphur trioxide. As such the overall percentage conversion of sulphur dioxide to sulphur trioxide will be susbtantially higher than 97.5% depending upon the proportion of sulphur trioxide removed from the gaseous reaction mixture as sulphuric acid during passage through the catalyst zones.

In particular the overall percentage conversion of sulfur dioxide to sulfur trioxide may be represented by an equation that varies with the number of stages of recovery. For example, in conventional processing where acid is recovered once after all the conversion stages the overall yield is given by Equation 1 below. Normally this degree of recovery is sufficiently high and is ignored. $y_1$ is the molar ratio of $SO_3$ as itself or as sulfuric acid in the vapour divided by the total sulfur compounds at the $i$th point of recovery. $R_1$ is a fraction of the $SO_3$ in sulfuric acid which is recovered at this point. Normally the recovery is sufficiently high that it is not considered in conventional plants. Equation 2 below gives the overall yield when there is an additional stage of recovery as in the present invention. The subscript 1 refers to the intermediate stage of recovery and subscript 2 refers to the final stage of recovery. For three stages of recovery the overall yield is given by Equation 3. In all cases intermediate recovery increases the overall yield.

(1) Overall yield=$y_1 R_1$ one stage recovery
(2) Overall yield=$y_2(1.0 - y_1 R_1)R_2 + y_1 R_1$ two stages of recovery
(3) Overall yield=$y_3(1 - y_2(1 - y_1 R_1)R_2)R_3 + y_2(1 - y_1 R_1)R_2 + y_1 R_1$ three stages of recovery.

The process of the present invention has a further major advantage namely that by the condensation of sulphuric acid from the gaseous reaction mixture of sulphur dioxide and the oxygen containing gas during its passage through the catalyst zones the heat of formation of sulphur trioxide, the heat of formation of sulphuric acid vapour and the heat of condensation of sulphuric acid vapour to liquid sulphuric acid is available for direct recovery in the heat exchanger and this may readily be used to generate steam for use in the process such as the steam admixed with the gaseous reaction mixture of sulphur dioxide and the oxygen for condensation of sulphuric acid in the heat exchanger. It will be seen that the heat introduced into the gaseous reaction mixture in the form of steam, i.e., the heat of vapourisation of the steam is recovered in the heat exchanger and further that it is recovered at a higher temperature level and this can be more usefully used. Further with the use of a heat exchanger in particular an evaporator condenser with good heat exchange surfaces it is possible due to the high temperature of 400 to 600° C. in the catalyst zone to recover from the heat exchanger high temperature high pressure steam which may be used for the overall operation of the plant such as for power generators for the pumps as well as the steam turbines employed for running the blowers in the plant. With maximum heat transfer it has been found possible to recover as much as 37% more heat from the process as high grade steam than would be possible with the conventional process.

The gases exiting from the final catalyst zone which contain sulphur trioxide may be treated in any suitable manner for the recovery of the sulphur trioxide as sulphuric acid. However in accordance with a preferred embodiment of the present invention the sulphur trioxide in the gases exiting from the final catalyst zone is condensed in the presence of steam in at least one heat exchanger as sulphuric acid care being taken to avoid the formation of a sulphuric acid mist. In a particularly preferred embodiment of the present invention the heat exchanger has good exchange surfaces so as to recover the heat from the exit gases at high temperature for the reasons given above. With such heat exchangers however it has been found necessary in order to avoid sulphuric acid mist formation to condense the sulphuric acid from the exit gases in a plurality of heat exchangers connected in series, the exit gases being passed successively through the heat exchangers which operate at successively lower temperatures. Thus, in contrast to the process of U.S. Patent No. 2,172,617 which uses heat exchangers having slow heat transfer characteristics to avoid, on condensation, formation of sulphuric acid mist therein, by the use of a plurality of heat exchangers having good heat transfer characteristics operating at successively lower condensation temperatures the heat may be recovered at high temperature and as such high temperature-high pressure steam may be obtained without the formation of sulphuric acid mist.

In order to obtain the benefits of the present invention it is only necessary that steam is present in the heat exchanger in which the sulphuric acid is condensed. This steam may be admixed with the gaseous reaction mixture at any convenient point in the process such as in the heat exchanger, prior to entry of the gaseous reaction mixture into the heat exchanger or prior to the entry of the gaseous reaction mixture into the catalyst zone or any combination thereof or in the air before reaction with sulphurs.

The temperature at which the heat transfer surfaces are maintained must be low enough to condense the sulphuric acid, i.e. must be below the dew point of the sulphuric acid under the prevailing conditions of partial pressure of the sulphur trioxide and water vapour in the heat exchanger. On the other hand these surface temperatures must not be so low that the temperature of the gas at any point is low enough to result in spontaneous nucleation leading to the formation of a sulphuric acid mist. It will be readily seen with regard to the gases exiting from the final catalyst zone that as they pass through each heat exchanger the concentration and therefore partial pressure of the sulphur trioxide and water vapour falls and thus the condensation temperature in each heat exchanger is successively reduced.

As aforesaid it is highly desirable to use heat exchangers, e.g. evaporator condensers which have a good heat transfer surface and at the same time resist corrosion due to the condensation of sulphuric acid at high temperatures, usually above 200° C. In this direction the shell of the evaporator condenser may be suitably made from silicon iron and the tubes thereof on the evaporator side may suitably be formed from a silicon treated surface to maintain good heat transfer. The condenser shell should be made of a material which had good corrosion resistance to hot concentrated sulphuric acid. Thus it will be readily seen that by the process of the present invention it is possible to increase the percentage conversion of sulphur dioxide into sulphur trioxide in the catalyst zone and as such increase the yield of sulphuric acid and at the same time recover more heat from the process at a higher temperature level which may be used to operate the plan and thus render the process more economical than has heretofore been possible.

The amount of steam introduced into the gaseous mixture of sulphur dioxide and the oxygen containing gas must of course be sufficient to form sulphuric acid with substantially all of the sulphur trioxide formed by the oxidation of the sulphur dioxide in the catalyst zone. However it has been found desirable in order to obtain sulphuric acid of concentration over 98.6% to admix the steam and the gaseous reaction mixture in an amount insufficient to form concentrated sulphuric acid, i.e. sulphuric acid of about 98.6% concentration such that in the gases exiting from the catalyst zone there is an excess of sulphur trioxide over the stoichiometric amount in the formation of concentrated sulphuric acid. However in order to avoid loss of sulphur trioxide from the final condensation of the gases exiting from the catalyst zone due to there being insufficient steam present it is necessary to pass the gases through a plurality of heat exchangers and in the final heat exchanger to have sufficient steam to ensure condensation of all the sulphur trioxide to sulphuric acid. Obviously in this last heat exchanger the condensed sulphuric acid will not be above 98.6% concentration.

In accordance with a further aspect of the present invention there is provided a process for the production of sulphuric acid which comprises oxidizing sulphur dioxide to sulphur trioxide with an oxygen containing gas in the presence of a contact catalyst at elevated temperature in a plurality of catalyst zones the gaseous reaction mixture being cooled after passage through each catalyst zone and condensing sulphuric acid from the gaseous reaction mixture exiting from said catalyst zones in a plurality of heat exchangers having good heat transfer surfaces whereby to generate steam from said heat exchangers, steam being present in the gaseous reaction mixture in the heat exchanger in an amount such that there is an excess of sulphur trioxide over the stoichiometric amount with respect to the steam necessary for the production of concentrated sulphuric acid. In contrast to the process described in U.S. Patent No. 2,172,617 the process of the present invention produces high temperature steam and highly concentrated sulphuric acid whereas the process of the United States patent merely produces concentrated sulphuric acid not above 98.6%.

As stated previously it is essential for the benefits of the present invention to withdraw at least a portion of the gaseous mixture from the catalyst zones after it has passed through the first or at least one of the intermediate catalyst zones to condense sulphuric acid therefrom during the cooling of the gas and suitably from 30 to 50% of the sulphur trioxide present in the reaction mixture entering the evaporator condenser is condensed therefrom as sulphuric acid in any particular cooling operation. While the benefits of the invention may be achieved by condensing sulphuric acid from the gaseous mixture after passage through one of the catalyst zones, preferably the first catalyst zone, it will be readily realized that the condensation of sulphuric acid from the gaseous reaction mixture after passage through each of the catalyst zones will increase the percentage conversion of sulphur dioxide to sulphur trioxide. It is therefore preferred to effect the cooling of the gaseous reaction mixture after passage through each of the catalyst zones to condense sulphuric acid therefrom.

The catalyst for use in the present invention should desirably be resistant to attack by sulphur trioxide in the presence of water vapour and the catalysts disclosed in U.S. Patent 2,172,617 are suitable. A particularly suitable catalyst comprises vanadium pentoxide and in particular vanadium pentoxide in admixture with precipitated silica and alkali metal oxide such as potassium oxide. The sulphur dioxide used in the process of the present invention may be obtained from any suitable source but conveniently it is produced by a combustion of sulphur or an oxidation of hydrogen sulphide as these two sources are conventionally used in contact processes.

FIGURE 2 of the accompanying drawings represents a detail showing the passage of a gaseous reaction mixture of sulphur dioxide and an oxygen containing gas through a plurality of catalyst zones in accordance with one embodiment of the process of the present invention.

Referring to the drawings sulphur dioxide passes through line 10 to catalyst converter 11 which contains a plurality of catalyst zones 12 containing a contact catalyst. During its passes through the conduit 10 the sulphur dioxide is mixed with air entering through a side arm 13 and steam entering through a side arm 14. The catalyst 12 in the converter 11 is maintained at a temperature in the range 400 to 600° C. by the exothermic nature of the oxidation of sulphur dioxide to sulphur trioxide and after passage through any particular catalyst zone 12 the gaseous reaction mixture is cooled so as to obtain the maximum conversion of sulphur dioxide to sulphur trioxide, for instance according to the plot shown in FIGURES 1A and 1B.

During its passage through the catalyst converter 11 and after passage through the first catalyst zone 12 the gaseous reaction mixture is withdrawn from zone 9 through line 15 into a heat exchanger 16 desirably in the form of a condenser evaporator where it is cooled to the temperature to condense sulphuric acid therefrom, the sulphuric acid being withdrawn as a product through line 17 and the cooled gases are returned through line 18 to the catalyst converter 11 for subsequent passage through the second, third and fourth catalyst zones 12 with cooling in the zones 9 intermediate the catalyst zones 12 by cooling means (not shown). On emergence from the final catalyst zone one in the catalyst converter 11 the sulphur trioxide containing gas is condensed first in a heat exchanger 19 which again is suitably a condenser-evaporator operated at a temperature suitably of above 200° C. to condense a portion of the sulphur trioxide therefrom as sulphuric acid which is withdrawn as a product through line 20 and there is a second heat exchanger 21 operated suitably at a temperature above 100° C. to condense the remainder of the sulphur trioxide as sulphuric acid which is withdrawn as a product through line 22, the exhaust gases passing through line 23. In the heat exchangers 19 and 21 the heat removed from the gaseous reaction mixture is converted into high temperature-high pressure steam which is used for operation of the plant.

It will readily be seen that in addition to or instead of admixing steam through the side arm 14 with the gaseous reaction mixture in line 10 before it enters the catalyst converter 11 to facilitate the condensation of sulphuric acid in the heat exchangers 16, 19 and 21, steam may be admixed with the gaseous reaction mixture in the heat exchangers 16, 19 and 21 and/or in the lines between the converter 11 and the heat exchangers 16, 19 and 21.

What I claim as my invention is:

1. In the production of sulphuric acid comprising oxidizing sulphur dioxide with an oxygen containing gas at elevated temperature in the presence of a contact catalyst in a plurality of catalyst zones, the improvement that comprises withdrawing and cooling at least a portion of the gaseous reaction mixture in the presence of high temperature, high pressure steam to condense sulphuric acid from said gaseous mixture in a heat exchanger after contact with the catalyst in at least the first or one of the intermediate catalyst zones and recovering the residual sulphur trioxide as sulphuric acid from the gases exiting from the final catalyst zone by condensing said sulphur trioxide in the presence of high temperature, high pressure steam in at least one heat exchanger having good heat exchange surfaces.

2. A process as claimed in claim 1 in which the sulphur trioxide is recovered from the gases exiting from the final catalyst zone by passage thereof sequentially through a plurality of heat exchangers having good heat exchange surfaces.

3. A process as claimed in claim 1 in which each heat exchanger is an evaporator condenser.

4. A process as claimed in claim 1 in which 30 to 50% of the sulphur trioxide present in the gaseous mixture withdrawn from the intermediate catalyst zone is condensed in the heat exchanger.

5. A process as claimed in claim 1 in which all the gaseous reaction mixture is withdrawn from the catalyst zones and cooled.

6. A process as claimed in claim 1 in which sulphur trioxide is condensed from the gaseous reaction mixture as sulphuric acid after passage through the first catalyst zone.

7. A process as claimed in claim 1 in which sulphur trioxide is condensed from the gaseous reaction mixture as sulphuric acid after passage through each of the catalyst zones as sulphuric acid.

8. A process as claimed in claim 1 in which the heat recovered in the heat exchangers is used to generate high pressure, high temperature steam.

9. A process as claimed in claim 1 in which the sulphur trioxide in the gases exiting from the final catalyst zone is condensed in the presence of steam by passage sequentially through a plurality of heat exchangers having good heat exchange surfaces operating at successively lower temperatures, the steam being present in the heat exchangers in an amount to condense all the sulphur trioxide as sulphuric acid.

10. A process as claimed in claim 9 in which the steam is present in all but the last heat exchanger of the series in an amount insufficient to form concentrated sulphuric acid and present in the last heat exchanger in an amount sufficient to condense all the residual sulphur trioxide as sulphuric acid.

References Cited

UNITED STATES PATENTS

| | | | |
|---|---|---|---|
| 2,071,598 | 2/1937 | Von Girsewald et al. | 23—167 |
| 2,115,091 | 4/1938 | Von Girsewald et al. | 23—168 |
| 2,172,617 | 9/1939 | Koolman et al. | 23—175 |
| 3,259,459 | 7/1966 | Moller | 23—176 |

OSCAR R. VERTIZ, Primary Examiner

G. T. OZAKI, Assistant Examiner

U.S. Cl. X.R.

23—175